(12) United States Patent
Chen

(10) Patent No.: US 11,936,768 B2
(45) Date of Patent: Mar. 19, 2024

(54) OBFUSCATING CRYPTOGRAPHIC PARAMETERS USED IN ELLIPTICAL CURVE CRYPTOGRAPHY, AND RELATED SYSTEMS AND DEVICES

(71) Applicant: Microchip Technology Incorporated, Chandler, AZ (US)

(72) Inventor: Huiming Chen, Colorado Springs, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 38 days.

(21) Appl. No.: 17/086,007

(22) Filed: Oct. 30, 2020

(65) Prior Publication Data

US 2021/0184831 A1 Jun. 17, 2021

Related U.S. Application Data

(60) Provisional application No. 62/949,285, filed on Dec. 17, 2019.

(51) Int. Cl.
| | | |
|---|---|---|
| *H04L 9/00* | (2022.01) | |
| *G06F 7/72* | (2006.01) | |
| *H04L 9/30* | (2006.01) | |
| *H04L 9/32* | (2006.01) | |

(52) U.S. Cl.
CPC ............. *H04L 9/002* (2013.01); *G06F 7/723* (2013.01); *G06F 7/725* (2013.01); *H04L 9/3066* (2013.01); *H04L 9/3252* (2013.01); *H04L 2209/08* (2013.01); *H04L 2209/16* (2013.01)

(58) Field of Classification Search
CPC ..... H04L 9/002; H04L 9/3066; H04L 9/3247; H04L 9/3252; H04L 2209/08; H04L 2209/16; G06F 7/72; G06F 7/723; G06F 7/724; G06F 7/725
See application file for complete search history.

(56) References Cited

U.S. PATENT DOCUMENTS

| | | | |
|---|---|---|---|
| 2001/0048742 A1* | 12/2001 | Handschuh | G06F 7/725 380/30 |
| 2014/0095883 A1* | 4/2014 | Kirillov | H04L 9/0891 713/176 |
| 2016/0328541 A1 | 11/2016 | Hoogerbrugge et al. | |
| 2018/0343119 A1 | 11/2018 | Chen | |

OTHER PUBLICATIONS

Mimi et al., "Elliptic Curve Point Multiplication Algorithm Using Precomputation," WSEAS Transactions on Computers, Nov. 2013, Issue 11, vol. 12, E-ISSN: 2224-2872, 419-431.

(Continued)

*Primary Examiner* — D'Arcy Winston Straub
(74) *Attorney, Agent, or Firm* — TraskBritt

(57) ABSTRACT

An obfuscation process is described for obfuscating a cryptographic parameter of cryptographic operations such as calculations used in elliptical curve cryptography and elliptical curve point multiplication. Such obfuscation processes may be used for obfuscating device characteristics that might otherwise disclose information about the cryptographic parameter, cryptographic operations or cryptographic operations more generally, such as information sometimes gleaned from side channel attacks and lattice attacks.

20 Claims, 8 Drawing Sheets

(56) References Cited

OTHER PUBLICATIONS

Joye, "Elliptic Curves and Side-Channel Analysis," ST Journal of System Research 4(1), 2003, 283-306.
Goudarzi et al., "Lattice Attacks against Elliptic-Curve Signatures with Blinded Scalar Multiplication," ENS, SAC Aug. 12, 2016, St. Johns, 3 pages.
Houssain et al., "Power Analysis Attacks on ECC: A Major Security Threat," (IJACSA) International Journal of Advanced Computer Science and Applications, vol. 3, No. 6, 2012, 90-96.
Langley et al., "Elliptic Curves for Security," Internet Research Task Force (IRTF), ISSN: 2070-1721, Jan. 2016, 22 pages.
Goudarzi et al., "Lattice Attacks against Elliptic-Curve Signatures with Blinded Scalar Multiplication," CryptoExperts, ENS, CNRS, INRIA and PSL Research University, Paris, France, 20 pages.
International Search Report from International Application No. PCT/US2020/058363, dated Feb. 15, 2021, 5 pages.
International Written Opinion from International Application No. PCT/US2020/058363, dated Feb. 15, 2021, 9 pages.
Okeya et al., "SCA-Resistant and Fast Elliptic Scalar Multiplication Based on WNAF," IEICE Transactions on Fundamentals of Electronics, Communications and Computer Sciences, Engineering Sciences Society, Tokyo, JP, vol. E87-A, No. 1 (Jan. 1, 2004), pp. 75-84.

\* cited by examiner

OBFUSCATING CRYPTOGRAPHIC PARAMETERS USED IN ELLIPTICAL CURVE CRYPTOGRAPHY, AND RELATED SYSTEMS AND DEVICES

CROSS-REFERENCE TO RELATED APPLICATION

This application claims the benefit under 35 U.S.C. § 199(e) of U.S. Provisional Patent Application Ser. No. 62/949,285, filed Dec. 17, 2019, the disclosure of which is hereby incorporated herein in its entirety by this reference.

FIELD

One or more embodiments relate, generally, to elliptic curve cryptography, and more specifically, some embodiments relate to obfuscating parameters and device operations more generally when performing elliptic curve cryptography.

BACKGROUND

Many calculations are used in cryptography, including to calculate private keys, shared secret keys, and public keys. Devices that perform such calculations are employed to facilitate secure and trusted communication among devices.

Cryptography schemes have become more advanced and sophisticated with the development of network communication. Methods of attacking and circumventing such cryptographic schemes have also become more sophisticated, requiring further development of technology security. Side channel attacks are one form of attack that use information gleaned from the implementation of a system instead of exploiting weaknesses in the algorithm itself. Therefore, the inventors of this disclosure appreciate that it is advantageous to obfuscate and blind the physical and electrical processes exhibited by devices perform cryptography calculations.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
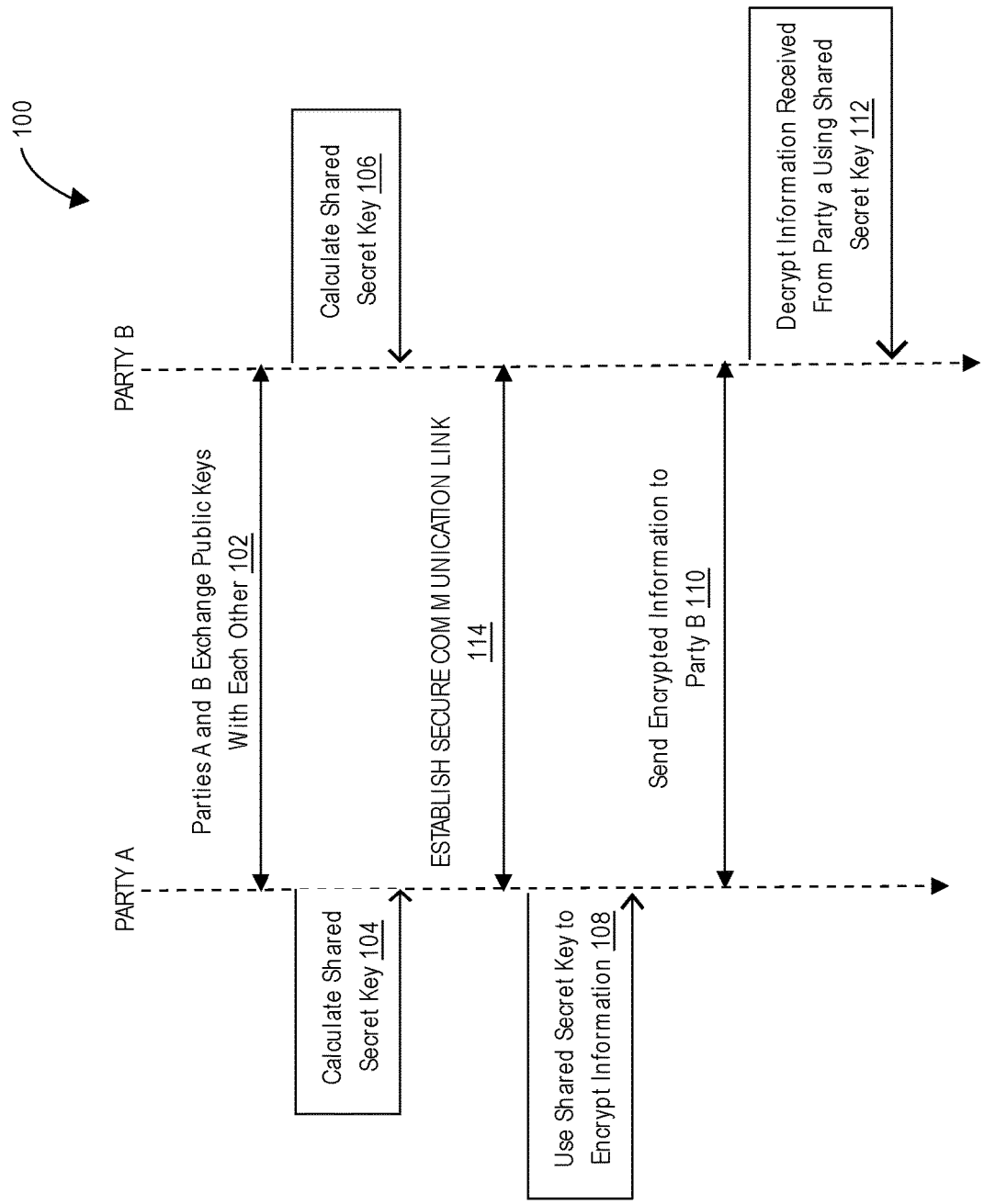
FIG. 1 is a flowchart depicting a specific example encryption and information-sharing process capable of improvement in accordance with an embodiment.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof.

Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, and so forth. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, a reference to a "cryptographic process" means the operations, including calculations that form part or all of the protocols relevant to performing encryption and decryption, generating and resolving keys, sub-keys, or performing any other step or calculation that is relevant to cryptology or cryptography. A cryptographic process may be performed by a device, for example, a cryptographic processor or a general-purpose processor executing some part of the protocol based on firmware or software. Non-limiting examples of a cryptographic process include algorithms for generating cryptographic information (e.g., for generating public keys, private keys, shared secret keys, and any various intermediate keys, without limitation), and protocols for exchanging cryptographic information, identity information, and for agreeing to protocols.

As used herein, "obfuscating device characteristics" means rendering obscure or unclear any externally observable characteristic of the device and information gleaned therefrom, including, without limitation, characteristics of the device during operation. Such characteristics may include without limitation: power consumption, timing information, magnetic field information, heat signature information, other information similar in character, and combinations thereof. Obfuscation does not mean that information cannot be discerned from device characteristics, though that could be the result, and is meant to include making such information less useful or to require more processing to render such information useful.

Long strings of zeros in a private key allow hackers to glean information about the private key by analyzing power signatures of a chip during a computation. To fully hide the value of a private key used in cryptographic operations, a random number with the same length as the private key is used to obfuscate the value of the private key. Additionally, a special constant value is added to the private key to ensure that no relevant portion of the key is zero. A revised algorithm to process the private key is then used to extract the proper information from the obfuscated private key.

FIG. 1 is a swim lane flowchart depicting an encryption information exchange process 100 (e.g., public/private key authentication and/or key agreement protocol, without limitation) between two parties, Party A and Party B, in accordance with the prior art known to the inventor of this disclosure. FIG. 1 is also a non-limiting example of an encryption information-exchange process that may be improved by obfuscation disclosed herein.

The exchange of information depicted by FIG. 1 may occur over any suitable communication link for sending and receiving messages established via any suitable combination/sub-combination of connections of wired/unwired paths. A connections may include a network connection such as the Internet or a private network, a local connection that does not require Internet or network access, a communication interface such as interfaces for serial and parallel communication, and combinations/sub-combinations thereof, without limitation.

In operation 102, Party A and Party B of process 100 exchange their public keys with each other. As non-limiting examples, Party A and/or Party B may retrieve respective previously generated public keys or generate their respective public keys using a previously generated private key, and send such public key to each other.

In operation 104 and operation 106, Party A and Party B of process 100 each calculate a shared secret key using their respective private keys and the public key received from operation 102. The calculation(s) performed in operation 104 and operation 106 may include, as non-limiting examples, cryptographic operations according to cryptographic algorithms used for public/private key authentication (e.g., co called "sign and verify," without limitation) or for a specific cryptographic agreement protocol implemented by Party A and Party B. Non-limiting examples of cryptographic agreement protocols include Elliptic Curve Diffie-Hellman or an Elliptic Curve Digital Signature Algorithm. Non-limiting examples of cryptographic algorithms include elliptic curve point multiplication and modular exponent.

In the example depicted by FIG. 1 upon successfully calculating the necessary cryptographic information of a cryptographic key agreement protocol and establishing a secure communication link in operation 114, in theory, Party A and Party B can communicate with each other using the secure communication link and, more specifically, using public key type encryption such as "sign and verify." In operation 108, Party A of process 100 uses the shared secret key calculated in operation 104 to encrypt information. In operation 110, Party A sends a message to Party B that includes the encrypted information of operation 108. In operation 112, Party B decrypts the encrypted information received from Party A using the shared secret key calculated in operation 106 and using any other tools agreed to in advance by the parties, such as Party A's public key shared in operation 102.

Figures 2A, 2B:
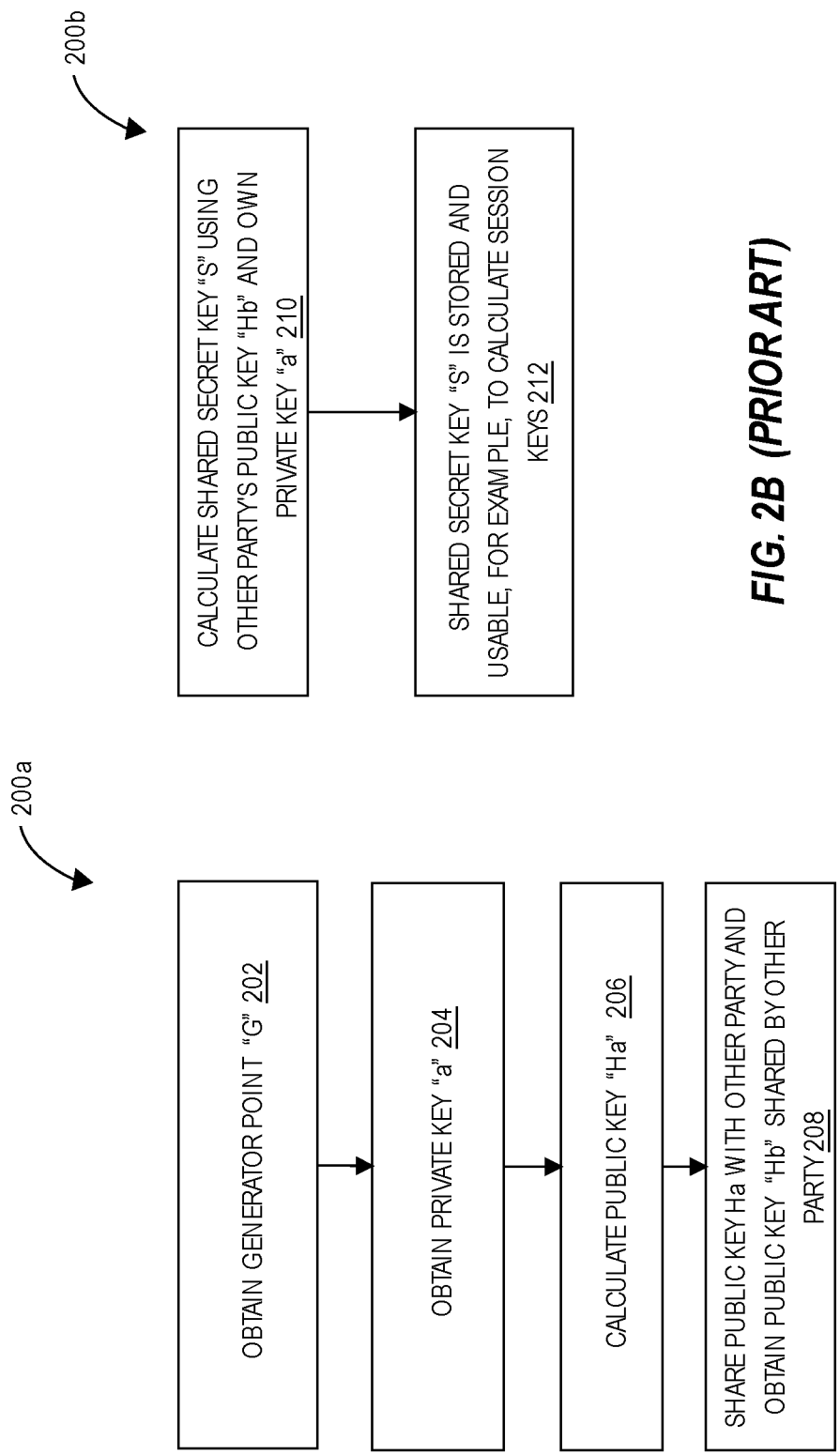
FIG. 2A is a flowchart depicting a specific example process capable of improvement in accordance with an embodiment.
FIG. 2B is a flowchart depicting a specific example process capable of improvement in accordance with an embodiment.

During processes such as process 100, where parties exchange encryption information, any of a number of cryptographic operations may be performed by Party A and Party B and those cryptographic operations may be observable by an attacker. FIG. 2A and FIG. 2B depict two non-limiting examples of cryptographic processes that could be observed: FIG. 2A depicts a process 200a for obtaining a public key using elliptic curve point multiplication and FIG. 2B depicts a process 200b for obtaining a shared secret key using elliptic curve point multiplication.

In the case of elliptic curve cryptography point multiplication, a private key is a cryptographic parameter "a" that specifies a transformation from a generator point G to a destination point P on a given elliptic curve. A non-limiting example of an algorithms usable to arrive at destination point P from generator point G on an elliptic curve, is for the generator point G to be point multiplied by itself some number of times or doubled and added to itself (so called "double-add"). In such cases, the private key is the number of times the generator point G is point multiplied by itself. Notably, consistent with convention, additive algorithms fall under the term "elliptical curve point multiplication," and so dG can refer to exponential operations G1, G2 . . . Gd, and can refer to additive operations G, 2G, 3G . . . dG. Specific non-limiting examples used herein are additive, but other forms of point multiplication, including exponential, do not exceed the scope of this disclosure and are specifically contemplated. Elliptic curve point multiplication is discussed mathematically later herein.

Turning to the specific example depicted by FIG. 2A, in operation 202, process 200a obtains a generator point G on a given elliptic curve. As non-limiting examples, a generator point G and elliptic curve function may be obtained from an authority that shares the generator point G and the elliptic curve function, or shares the elliptic curve function and parameters for calculating generator point G. The parties to an encrypted communication may agree in advance to use a pre-determined generator point G or elliptic curve function, a generator point G or elliptic curve function provided by a specific authority, or methods and parameters for calculating the same. A generator point G is also sometimes referred to as a base point Q.

In operation 204, process 200a obtains a private key "a." A private key may be a number or a string. The private key may have been previously calculated and stored or calculated on the fly, as needed.

In operation 206, process 200a calculates a public key "Ha" at least partially based on its private key "a." A relationship between public key Ha, private key "a," and generator point G is expressed by Equation 1:

$$aG = H_a \qquad \text{Equation (1)}$$

More specifically, public key Ha may be calculated by performing a point multiplication algorithm using private key "a" and generator point G.

In operation 208, Process 200a shares public key Ha with another party, and obtains the other party's public key "Hb."

Turning to the specific example depicted by FIG. 2B in operation 210, process 200b calculates shared secret key "S." For example, process 200b may calculate the shared secret key "S" using the other parties public key Hb and its own private key "a," according to Equation 2:

$$aH_b = S \qquad \text{Equation (2)}$$

Similarly, the other party calculates another shared secret key "S" using its private key and the public key Ha. Notably, if each party calculates its public key using its own private key and calculates the shared secret key "S" using the other party's public key and its own private key, then each party's respective calculation of the shared secret key S is influenced by the other party's private key.

In operation 212, shared secret key "S" obtained from operation 210 is stored. If a key agreement protocol is performed as expected then shared secret key "S" is commonly known by Party A and Party B. Since shared secret key "S" is never actually exchanged between the parties performing the key agreement protocol, an unauthorized party listening to their communications does not have an opportunity to intercept it. So, shared secret key "S" can be safely used for encrypting and decrypting information transferred between Party A and Party B. For example, in a typical implementation of Elliptic Curve Diffie-Hellman key exchange, a shared secret key "S" may be used to derive session keys for encrypted communication.

Each of the cryptographic processes exemplified by process 200a and process 200b may include one or more cryptographic operations. For example, elliptic curve point multiplication may be used in operation 206 of process 200a to calculate public key Ha, and may also be used in operation 210 of process 200b to calculate the shared secret key "S."

Attackers want to discern information about cryptographic operations that rely on secret cryptographic parameters and cryptographic information, such as private keys and shared secret keys, without limitation. One technique some attackers use is to observe characteristics exhibited by devices performing cryptographic operations that use secret cryptographic information. Non-limiting examples of the characteristics exhibited by devices that may be observed include timing, power consumption, thermal changes, and magnetic field generation of the device, which may be used by an observer to obtain information about cryptographic operations being performed by the device. With information observed from the device and a known (or suspected) relationship between the observed information and the inputs to cryptographic operations, an attacker can obtain the inputs to the cryptographic operations. As a non-limiting example, an attacker can learn inputs from the timing/power signature of the device during a calculation at least partially based on a known relationship between the inputs and such timing/power signatures.

By obfuscating one or more cryptographic operations the known or suspected relationships between inputs and exhibited characteristics become weaker and so the calculations, keys, and other secret cryptographic information may be further hidden from attackers.

Sometimes shortcuts are taken to speed up cryptographic operations, for example, to accommodate limitations with respect to processors, power, or memory. The inventor of this disclosure appreciates that these shortcuts can create markers and resulting exhibited characteristics of a device that are observable and usable by an attacker, including to circumvent or overcome an attempt to obfuscate a cryptographic process.

An important aspect of elliptic curve cryptography (ECC) is elliptic curve point multiplication (ECPM) (ECC that uses ECPM is also referred to herein as elliptic curve cryptography point multiplication or "ECCPM"). ECPM yields a destination point P on a curve, and the relationship between the base point Q (referred to as the generation point G in ECC) and the destination point P (referred to as the public key Ha in ECC), is the scalar "d" (referred to as the private key "a" in ECC).

In this disclosure "point multiplication" is used as a shorthand for "elliptic curve point multiplication." Use of point multiplication with other curves for cryptographic operations does not exceed the scope of this disclosure, such as modular exponential without limitation. Use with algorithms that are not double-add type (for example, a so called "compact algorithm" such as the X25519 Diffie Hellman as specified in the Request for Comments (RFC)-7748 of the Internet Research Task Force (IRTF) dated January 2016, without limitation) is contemplated and does not exceed the scope of this disclosure, for example, use with a converter for converting a double-add format.

Different methodologies may be used to prevent the disclosure of a party's private key while performing point multiplication. For example, assume an elliptic curve E is expressed by Equation 3:

$$E: y^2 = x^3 + ax + b \qquad \text{Equation (3)}$$

Suppose a base point Q on elliptic curve E is point multiplied to arrive at destination point P, then the relationship between Q and P is expressed by Equation 4, where "*" is a mathematical operator for point multiplication:

$$P = d*Q \qquad \text{Equation (4)}$$

Algorithm 1 defines a left-to-right binary window-based type algorithm for performing point multiplication:

---
Algorithm 1
---
Input: $d = (d_{t-1}, \ldots \ldots, d_1, d_0)_2$, $Q \in E(F_q)$.
Output $P = dQ$
1. $P \leftarrow \infty$.
2. For i from t − 1 downto 0 do
 2.1 $P \leftarrow 2P$.
 2.2 If $d_i = 1$, then $P = P + Q$
3. Return (P)|

---

Shortcuts are sometimes taken in the point multiplication of ECC to speed up calculations. As a non-limiting example, in order to speed up the calculation in Algorithm 1, sometimes two or more bits, but fewer than all the bits, of the scalar "d" are used for each step. The number of bits is referred to as a window size of u-bits, and u-bits of scalar d and base point Q are used for each iteration of Algorithm 1. Fixed and variable window sizes may be used without exceeding the scope, but unless otherwise expressly stated fixed window sizes and fixed windows are used in embodiments and examples discussed herein.

Sometimes step 2.2 of Algorithm 1 is skipped, but skipping step 2.2 may create an observable timing disclosure by a device (e.g., one or more observable characteristics exhibited by the device that can be used to determine timing information). More specifically, in order to obtain a timing-constant point multiplication, dummy addition may be added to Algorithm 1 if step 2.2 is skipped. This may obscure the timing-disclosure, but dummy calculations are unique modifications and a device performing such calculations may exhibit observable power signatures that correspond to the unique modifications. These power signatures may be observed through a side-channel attack (SCA), and as a result a zero bit of the scalar may be obtained. After discerning the zero bits, a lattice attack or another attack may be used to recover the other bits of the scalar, including in some instances plaintext bits (i.e., bits that are not blinded or otherwise transformed).

As another non-limiting example, in some cases, a plain text scalar may be used for point multiplication. If the same scalar is used and re-used for point multiplication, a profile attack and other clustering and correlation methods may be used to obtain the scalar.

To address potential disclosure of a scalar, a technique known to the inventor of this disclosure is to "blind" a scalar is before it is provided as a parameter for point multiplication such that a different, blinded, scalar will be used for each specific point multiplication. Given an order "n" (a 1-dimensional scalar) for base point "Q" (a 2-dimensional scalar) under Equation 3 then one approach known to the inventor is to create a new, randomized scalar k (a scalar "d" may also be referred to herein as a "plain text scalar" to differentiate it from a randomized scalar or further processed scalar) through a simple addition with a random number r and order n, as expressed by Equation 5:

$$k = d + r*n \qquad \text{Equation (5)}$$

By convention, order "n" is a one-dimensional scalar that satisfies $n*Q = \infty$. Accordingly, $r*n*Q = \infty$ then Equation 5 can be re-written and expressed by Equation 6:

$$k*Q = d*Q + r*n*Q = d*Q + \infty = d*Q \qquad \text{Equation (6)}$$

Each time a point multiplication is performed, a new random scalar is generated and used. While this method does indeed obfuscate the contents of a plain text scalar, the inventor of this disclosure appreciates several weaknesses in these techniques:

First, if the selected scalar includes runs of successive zeros (i.e., zeroed bits), then a special power signature may be exhibited and observed if any special addition (i.e., dummy addition) is applied to the zeroed bits.

Second, typically, a plain text scalar d and an order n have the same bit length, and a random number r is typically at least 32-bit long. Hence, according to Equations 5 and 6, a randomized scalar k will be at least 32-bit longer than the plain text scalar d, which slows down the ECPM calculations (as compared to a smaller randomized scalar k). As a specific non-limiting example, if the plain text scalar is 8×32-bit, the ECPM process will be slower by 12.5% if a randomized scalar k is generated and used.

Third, for some ECC curves and base points Q, the order "n" may have very long uninterrupted zero valued bits. As a specific non-limiting example, assume "n" is a 64-bit number having long uninterrupted series of 0-valued bits. If a 32-bit random number "r" is used to blind "d," then at least 32 bits of "d" would not be blinded. If instead a 64-bit random number "r" is used to blind scalar "d," then randomized scalar "k" will be 64 bits longer than "d" and so the calculation will be much slower (more bits to crunch). In practice, the uninterrupted zero-valued bits can be very long. Therefore, any previously known obfuscation method may not be sufficiently efficient (e.g., computationally efficient, without limitation). As a specific non-limiting example, "n" for a secp224k1 key pair from Equation 5 is n=01 00000000 00000000 00000000 0001 DCE8 D2EC 6184 CAF 0A971 769 FB1F7. In order to use this order "n" to obfuscate the whole plain text scalar "d" using Equations 5, more than 96 bits are added to the plaint text scalar "d," which greatly reduces the efficiency of ECPM.

Generally, the inventor of this disclosure appreciates a need for an obfuscation process without some or all of the disadvantages discussed above.

One or more embodiments of this disclosure relate, generally, to an obfuscation process that may be applied to a cryptographic parameter (e.g., a private key, without limitation) to obtain a fully blinded obfuscated cryptographic parameter and thereby obfuscate cryptographic operations s of a cryptographic process.

Figure 3:
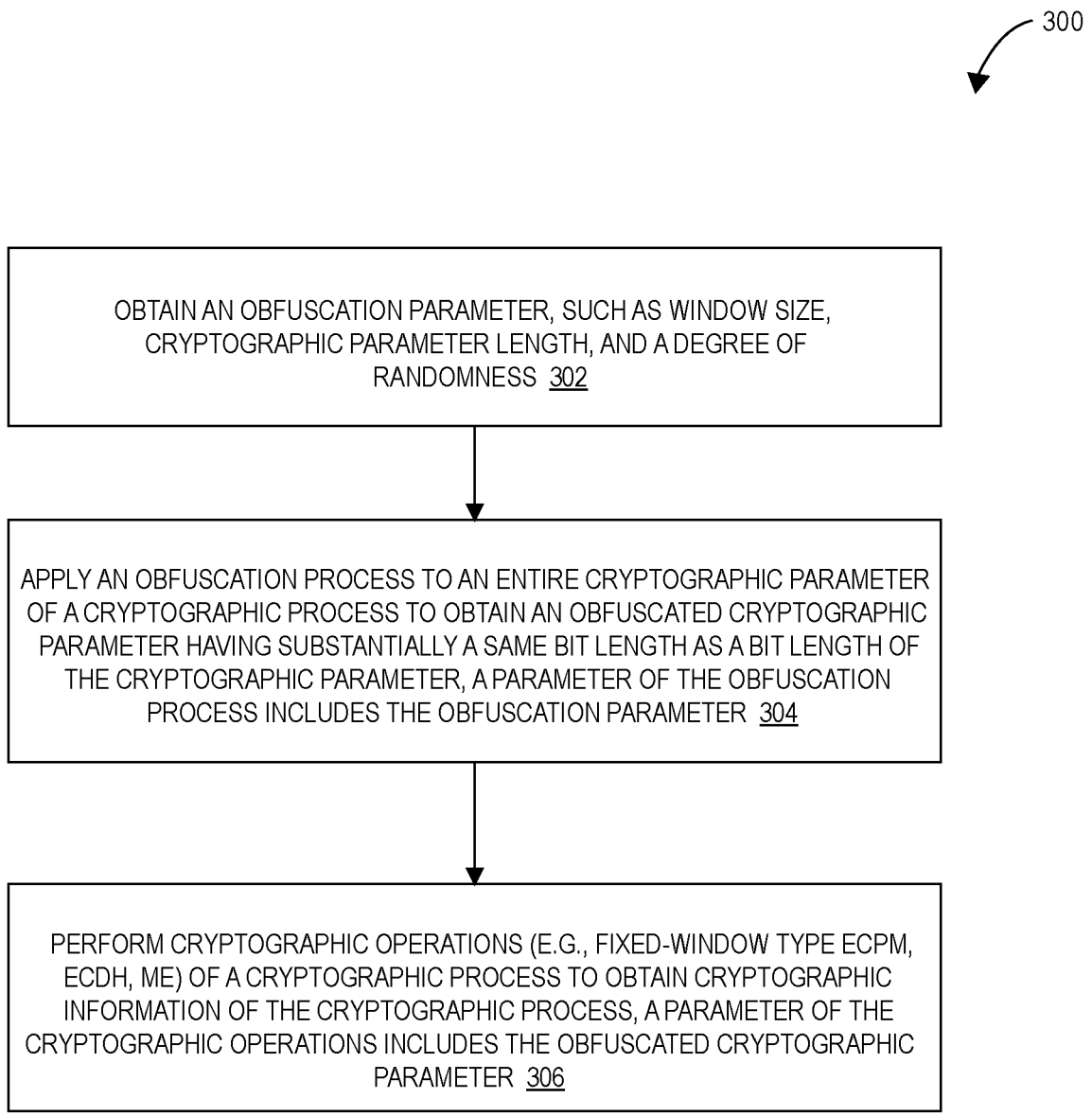
FIG. 3 is a flowchart depicting a general process of performing obfuscated cryptographic operations, in accordance with one embodiment.

FIG. 3 is a flowchart depicting a general process 300 for obfuscating cryptographic operations of a cryptographic process, in accordance with one or more embodiments. As non-limiting examples, process 300 may be applied to operations of process 200a or process 200b.

In operation 302, process 300 obtains one or more obfuscation parameters. In one or more embodiments, the obfuscation parameters may include one or more of window size (e.g., in bit-lengths) for a window-based ECPM, a length of a cryptographic parameter to be obfuscated, or a degree of randomness to be applied by an obfuscation process, without limitation. In one or more embodiments, a length of a private key, a public key, or any other cryptographic parameter, may be expressed in number of bits used to represent the parameter, without limitation.

In operation 304, process 300 applies an obfuscation process to a cryptographic parameter (e.g., a private key or shared secret key, without limitation) of a cryptographic process to obtain an obfuscated cryptographic parameter. The obfuscation process is applied to the entire cryptographic parameter, and more specifically, may be applied, directly or indirectly, to successive, discrete, window-sized portions of the cryptographic parameter as discussed herein. In one or more embodiments, the window-sized portions of the cryptographic parameter and/or derivations thereof (e.g., a first obfuscated cryptographic parameter, without limitation) may be consecutive or non-consecutive.

The obfuscated cryptographic parameter may be obtained having substantially a same bit length as a bit length of the cryptographic parameter, i.e. without substantially increasing the bit length of the obfuscated cryptographic parameter relative to the bit length of the original cryptographic parameter. By using window-sized portions of a randomized scalar k (e.g., a first obfuscated cryptographic parameter discussed below in relation to FIG. 4A and 4B) window-sized non-zero constant w, and window-sized random numbers r to calculate window-sized portions of variable e, the sum of each iteration of these components (e.g., fi) is window-sized and the string of the window-sized sums (i.e., fi=v→0) is the same bit length as the randomized scalar k and therefore the scalar d (the cryptographic parameter). The obfuscation parameters obtained in operation 302 are used as parameters of the obfuscation process applied to the cryptographic parameter. Other parameters may additionally be used with the obfuscation process without exceeding the scope of this disclosure.

In operation 306, process 300 performs cryptographic operations of a cryptographic process to obtain cryptographic information of the cryptographic process. The obfuscated cryptographic parameter obtained in response to applying the obfuscation process to the cryptographic parameter in operation 304 is used as a parameter of the cryptographic operations. The cryptographic operations may include point multiplication calculations of ECC discussed herein.

By performing the cryptographic operations using the obfuscated cryptographic parameter, device characteristics that might disclose information about the cryptographic operations, the cryptographic obfuscation parameters, and the cryptographic process more generally, may be obscured. As a non-limiting example, if an attacker understands a relationship between inputs to specific cryptographic operations and power signatures exhibited by a device performing those cryptographic operations, the obfuscation of the cryptographic operations disrupts the informational value of the relationship and/or the power signatures.

Figure 4A:
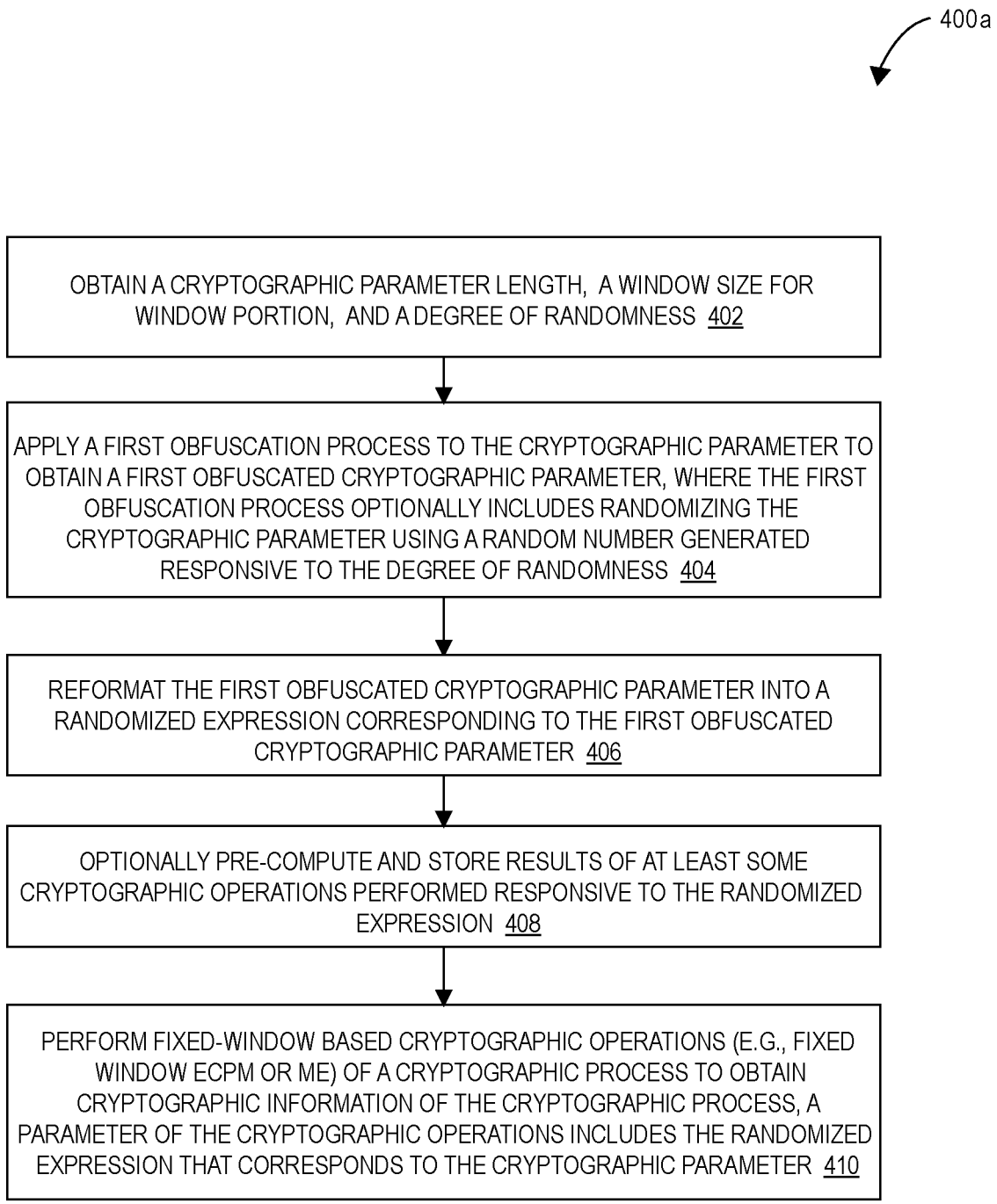
FIGS. 4A and 4B are flowcharts depicting processes for obfuscating cryptographic operations, in accordance with one or more embodiments.

FIG. 4A is a flowchart depicting an obfuscation process 400a for ECC in accordance with one or more embodiments. Obfuscation process 400a is a non-limiting example of the obfuscation process applied to the cryptographic parameter in process 300.

By way of general discussion, a "simply" or "first" obfuscated cryptographic parameter is generated according to Equation 5A (below) and re-formatted into an expression having three components: a random number, a non-zero constant, and a variable component. The random number contributes a degree of randomness to the obfuscated cryptographic parameter. The non-zero constant ensures that there are no runs of zeros present, and the variable component ensures that the obfuscated cryptographic parameter is relatable to the first obfuscated cryptographic parameter and therefore to the cryptographic parameter. Moreover, by selecting lengths for each component and optionally pre-computing certain results of ECPM, the entire cryptographic parameter may be blinded without substantially increasing the size (i.e., obfuscated cryptographic parameter is not meaningfully longer (bit length) than the cryptographic parameter) and therefore will have a negligible if any effect on the complexity of performing ECPM.

In operation 402, obfuscation process 400a obtains one or more obfuscation parameters such as a cryptographic parameter length, window size for each window portion of the cryptographic parameter, and a degree of randomness, without limitation.

In operation 404, obfuscation process 400a applies a first obfuscation process to the cryptographic parameter and thereby obtains a first obfuscated cryptographic parameter. In one embodiment, the first obfuscation process is a transformation of scalar d to the randomized scalar k according to Equation 5A. A one-dimensional random number r is generated, simple multiplied by order n and added to scalar d to generate new scalar k, the algorithm generally expressed as Equation 5A:

$$k = d + r \times n \qquad \text{Equation 5A}$$

As discussed above, the degree to which scalar d is blinded by equation 5A depends on the number of zero valued bits in order n and the length of random number r. Preferably, the bit length of random number r will be less than order n to simplify the processing. Given that Equation 7 (discussed below) includes a randomly generated component z, multiplying order n by random number r in Equation 5A is optional, in which case k would be a new scalar k instead of a randomized scalar k.

In operation 406, obfuscation process 400a re-formats the first obfuscated cryptographic parameter into a randomized expression corresponding to the first obfuscated cryptographic parameter.

Figure 4B:
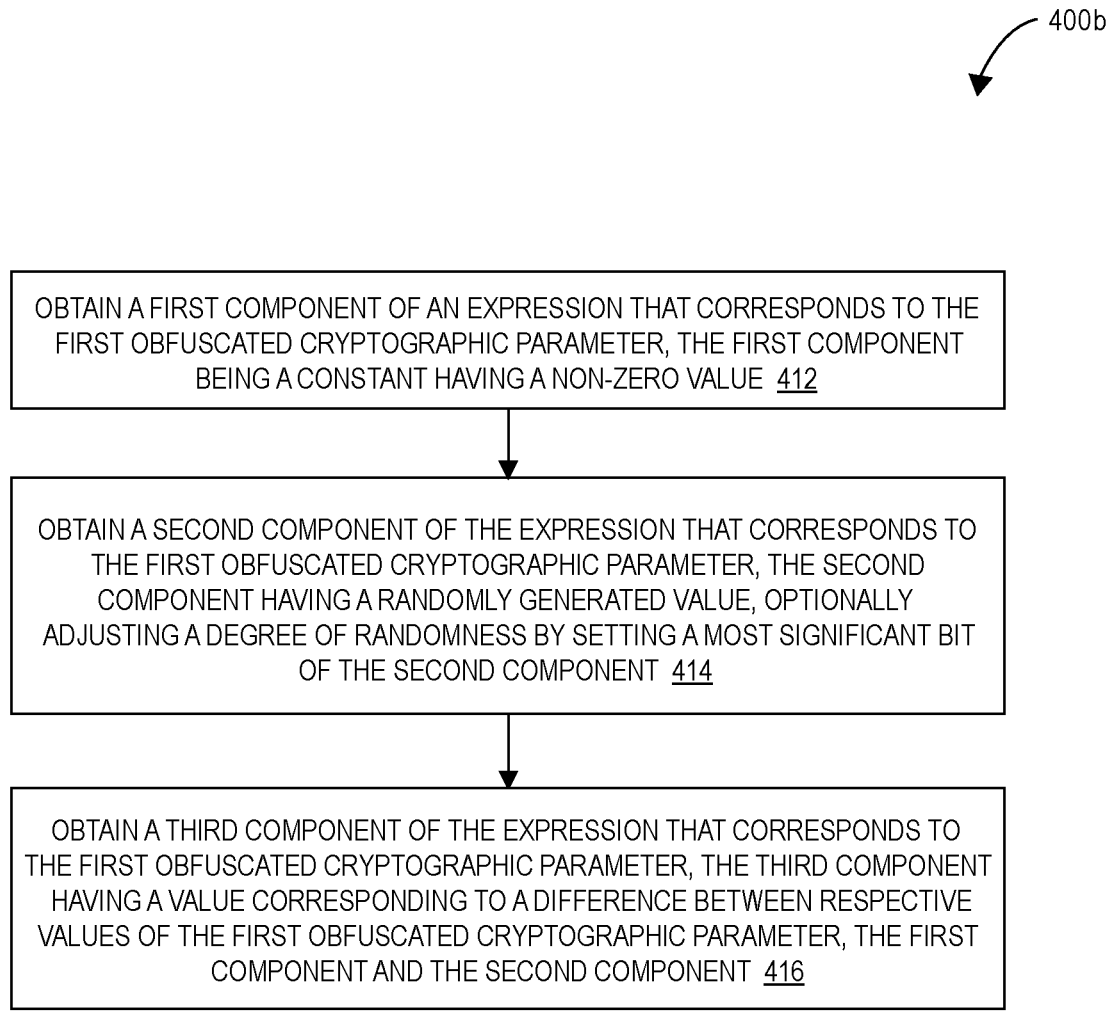

FIG. 4B is a flowchart depicting a process 400b for reformatting the first obfuscated cryptographic parameter in accordance with one or more embodiments. A randomized expression may have at least three components: a positive non-zero constant w, a random number z, and a variable e that relates w and z back to k. The randomized expression corresponds to Equation 7:

$$k = e + w + z \quad \text{Equation 7}$$

Given that new scalar k is the same bit-length as scalar d, for Equation 7 to be true e, w, and z should each be the same bit-length as new scalar k and therefore scalar d. Variable e may be calculated by subtracting non-zero constant w and random number z from new scalar k. Each of these components, e, w and z may be stored and used to perform ECCPM, in other words, the right side of the expression of Equation 7 is the input to standard left-to-right ECCPM.

For clarity, k re-formatted is referred to henceforth as new formulation f. After reformatting, fi (i=v-1, . . . , 0) can be expressed as Equation 8, where v is the number of u-bit sized portions to process and thus the number of iterations performed:

$$f_{i=v \rightarrow 0} = ((e_{i,u-1} \ldots e_{i,0}) + (w_{i,u-1} \ldots w_{i,0}) + (z_{i,u-1} \ldots z_{i,0})) \quad \text{Equation 8}$$

Continuing to refer to FIG. 4B, at operation 412, process 400b obtains a first component of an expression that corresponds to the first obfuscated cryptographic parameter, the first component having a non-zero constant value. The first component may also be referred to herein as a "non-zero constant w." It is preferably positive to minimize computation using binary math, however use of signed (i.e., positive or negative) binary representation does not exceed the scope of this disclosure.

Non-zero constant w ensures that the input to an ECPM block, as a whole, is a non-zero value which might otherwise cause a crypto-hardware executing ECPM to disclose special power signatures. Non-zero constant w may be a stored integer that was pre-calculated in advance or calculated for each cryptographic process. Non-zero constant w has a window-sized (i.e., u-bit) bit length. As a non-limiting example, if a window size of u-bit=3 is used then each window used in the left-to-right binary algorithm is 3 bits long and 3 bits are used to represent the non-zero constant w, which can have a value of 1 to 7.

At operation 414, process 400b obtains a second component of the expression that corresponds to the first obfuscated cryptographic parameter, the second component having a randomly generated value. The second component may also be referred to herein as a "random number z." Random number z ensures some degree of randomness in each operation. Random number z is an integer, randomly generated (e.g., using non-deterministic number generation, deterministic number generation, or combinations thereof, without limitation) that is the same bit-length as randomized scalar k or scalar d, or generated for each window sized portion of new formulation f. For example, if v is the number of discrete (i.e., no common bits among portions) window-sized portions in a first obfuscated cryptographic parameter, and in a non-limiting example v=10, then a random number z may have v window sized portions, or a random number zv=0->10 may include ten randomly generated numbers each represented by a window-sized number of bits.

At operation 416, process 400b obtains a third component of the expression that corresponds to the first obfuscated cryptographic parameter. The third component has a value that corresponds to a difference between respective values of the first obfuscated cryptographic parameter, the first component, and the second component. As each random number z is generated for given window-sized portions, specific window-sized portions of variable e (i.e., ei) may be calculated by taking the difference of the specific window-sized portion of first obfuscated cryptographic parameter k (i.e., ki) and the sum of random number z and non-zero constant w. Notably, the concatenation of ei=v to e0 has substantially the same bit-length as the respective bit-lengths of the first obfuscated cryptographic parameter and the cryptographic parameter.

When window-sized portions of e+w+z and base point Q are successively processed by a left-to-right binary algorithm according to the new formulation f, the processing is expressed by Algorithm 2:

---

Algorithm 2

---

Input: $k = (f_v, f_{v-1}, \ldots, f_1, f_0)_{2^u}$, $Q \in E(F_q)$.
Output P = kQ
1. P ← $f_v$ * Q
2. For i from v − 1 downto 0 do
   2.1 P ← $2^u$ * P.
   2.2 P = P + $f_i$ * Q
3. Return (P)

---

Under this new formulation, fi (i=v−1, . . . , 0) will no longer be between 0 and (2u−1). Every u-bit window-sized portion from left to right will never be zero (avoiding recognizable power signatures and/or need for dummy calculations), and its actual value can be between 1 and (2u+1-1), stated another way, in the case of 2 bits and constant w=1, between 1 and 7 because of the contribution by non-zero constant w and the extra randomness z to Equation 7.

Turning back to obfuscation process 400a of FIG. 4A: for a given window size of u-bits, there are a finite number of integer values represented by the expression e+w+z for a given window-sized portion, and so a finite number of outcomes for each iteration of Algorithm 2, i.e., 1*Q, 2*Q, 3*Q, . . . , m*Q, where m is a largest integer represented by a u-bit sized portion of f. Optionally, in operation 408, obfuscation process 400a calculates and stores the results of at least some cryptographic operations performed responsive to the expression having the obtained first component (operation 412 of process 400b), second component (operation 414 of process 400b) and third component (operation 416 of process 400b). As a non-limiting example, obfuscation process 400a calculates and stores the results of performing ECPM in response to new formulation f and the window size u. These stored pre-computed values or "pre-computes" may be used in each iteration of Algorithm 2 for fi*Q (step 2.2) to reduce computational complexity.

The number of outcomes and therefore pre-computes is proportional to a degree of randomness introduced via the random number z. In one or more embodiments, the number of pre-computes m calculated and stored may be selected by a degree of randomness introduced via random number z. In various embodiments, degree of randomness may be reduced by setting the binary value of a bit position of window-sized portion of random number z (e.g., the most significant bit) to a binary 1, or may be increased by adding more, different, random numbers z.

At operation 410, obfuscation process 400a performs fixed-window based cryptographic operations (e.g., fixed window ECPM or ME, without limitation) of a cryptographic process to obtain cryptographic information of the cryptographic process. A parameter of the cryptographic operation includes the randomized expression.

As used herein, the term "random number" includes true random number and a pseudo-random number unless the context would indicate a specific type of random number to a person having ordinary skill in the art. As non-limiting examples, random number generation may involve a non-recursive random number generator on chip, a linear-feedback shift register, random number generation software, and combinations thereof. Non-limiting examples of random number generation including deterministic random number generation, non-deterministic random number generation, and combinations thereof.

Notably, there is no zero-valued case from the possible conditions discussed above, and so, unlike conventional techniques known to the inventor of this disclosure, no special addition is required. The original scalar d is fully/absolutely obfuscated as new formulation f, and the length of the uninterrupted zero-valued bits (e.g., a succession of uninterrupted zero-valued bits) from the order n will not affect the obfuscation. When obfuscation has been performed according to disclosed processes, it reduces the strength of the correlation between discrete window-sized portions used in Algorithm 2. Reducing the strength of the correlation renders it much harder to perform a side channel attack (SCA) or other correlative or clustering attacks to obtain a scalar d (and more specifically the cryptographic parameter it represents), relative to conventional obfuscation processes known to the inventor of this disclosure. Notably, the bit-length of the new formulation f can be the same or shorter than the bit length of the original scalar d, and so the speed (e.g., rate of computation by crypto-hardware) will not be adversely affected by disclosed obfuscation processes as compared to conventional obfuscation processes that obtain a obfuscated scalar that is longer than the original scalar. Pre-computes also save some processing when performing a left-to-right binary algorithm for ECPM, and so there may be some trade-off in terms of time and memory space required to calculate and store pre-computes.

Notably, the power signature differences exhibited by devices performing precomputes may come from reading the content of the precomputes, but also may come from the addresses for different precomputes. In some embodiments, in order to further blind the contents and the addresses for the precomputes, the precomputes may be periodically or randomly blinded/un-blinded with a different random number each iteration, which should not adversely impact the efficiency of the ECC point multiplication.

Notably, in some use cases there may be physical elements in place to stop attempts to manipulate the original scalar d. In such cases, it may not be necessary to include the random number z in new formulation f, which otherwise would make it more difficult to discern timing information that can be used to attempt to manipulate scalar d. In such cases, a non-zero valued offset (i.e., non-zero constant w) may still be added for every u-bit of original scalar d to constrain a number of pre-computes. Constraining the number of pre-computes simplifies any blinding of the addresses of pre-computes and the address contents (e.g., the stored pre-computes) with different random numbers.

Notably, available memory space, degree to which power signatures are exhibited, degree to which cryptographic processes are susceptible to outside manipulation, and processing power of a crypto-hardware will vary from device to device and application to application. It is specifically contemplated that various characteristics, such as degree of randomness of random number z, value of the constant w, and number of pre-computes, without limitation, discussed above may be modified by a person having ordinary skill in the art to accommodate specific use cases, all without exceeding the scope of this disclosure.

Figure 5:
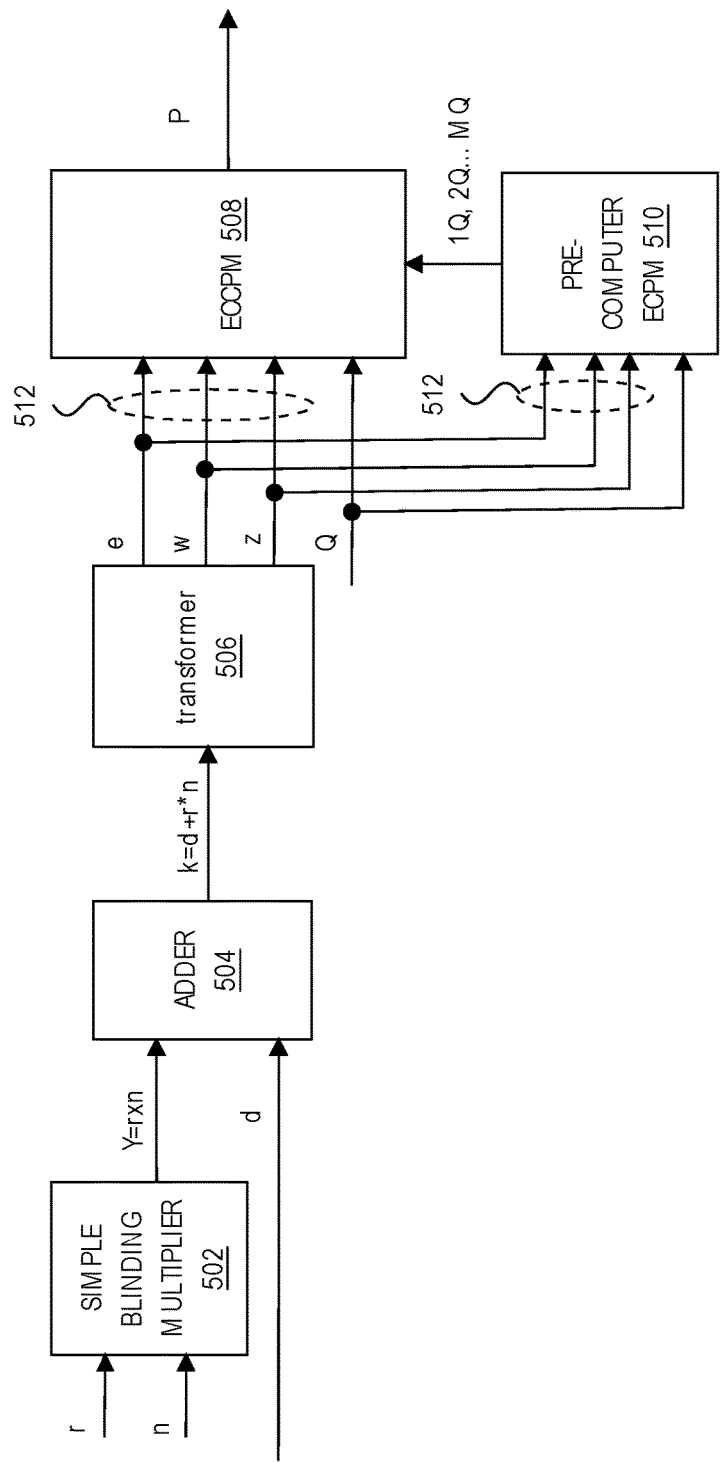
FIG. 5 is a functional block diagram depicting a circuit for obfuscating cryptographic operations, in accordance with one or more embodiments.

FIG. 5 is a functional block diagram depicting a circuit 500 configured to perform obfuscation process 400a. As depicted, circuit 500 includes the functional blocks of simple blinding multiplier 502, adder 504, transformer 506, ECCPM 508 and pre-computer ECPM 510, selected to emphasize functionality of processing logic the corresponds to each block and the inputs and outputs thereof.

Simple blinding multiplier 502 is a one dimensional multiplier configured to generate a result of simple multiplication of inputs r and n. Here, simple blinding multiplier 502 is configured to generate a result Y by performing binary multiplication of inputs, here, random number r and order n. Adder 504 is configured to perform binary addition of inputs, here, result Y, generated by simple blinding multiplier 502, and scalar d. Adder 504 generates randomized scalar k responsive to addition of result Y and scalar d. Transformer 506 is processing logic configured to transform (e.g., reformat, without limitation) randomized scalar k generated by adder 504 into a new formulation f that corresponds to the expression in Equation 7, with three components, variable e, non-zero constant w, and random number z.

Pre-computer ECPM 510 is an elliptic curve point multiplier configured to perform ECPM on window sized portions of new formulation f (labeled as input 512) and base point Q to generate pre-computes (e.g., 1Q, 2Q . . . mQ) made available to ECCPM 508. ECCPM 508 is an elliptic curve cryptography point multiplier that may use pre-computes generated by pre-computer ECPM 510 to perform ECPM on new formulation f (labeled as input 512) and base point Q to generate point P. In various embodiments, ECPM performed by ECCPM 508 and pre-computer ECPM 510 may be the left-to-right binary method for point multiplication of Algorithm 2, discussed above.

Figure 6:
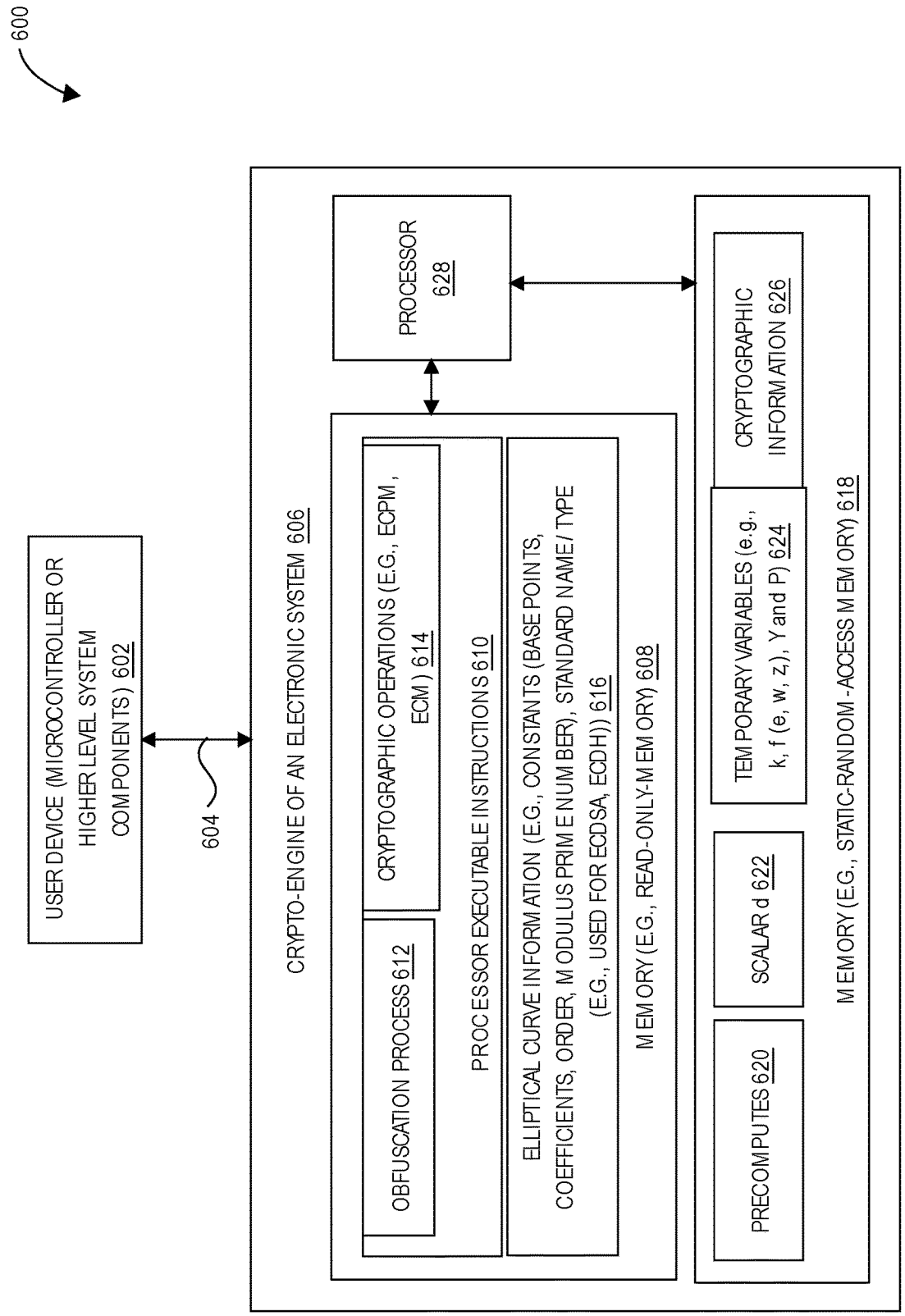
FIG. 6 is a block diagram depicting a system including a crypto-engine of an electronic system that is configured to obfuscate cryptographic operations according to the processes depicted by FIG. 3, FIG. 4 and FIGS. 4A and 4B, and circuit depicted by FIG. 5, in accordance with one embodiment.

FIG. 6 is a block diagram depicting a system 600 that includes a crypto-engine 606 configured to perform ECCPM using obfuscation as disclosed herein (e.g., performing process 400b and/or including the circuit 500), in accordance with one or more embodiments.

Crypto-engine 606 may be or form a portion of an electronic system, such as a system-on-a-chip or other microelectronic device, configured to provide cryptographic services to user device 602 (e.g., microcontrollers, or higher level system components, without limitation) via interface 604.

Crypto-engine 606 includes a memory 608, which may be a read-only memory, a memory 618, which may be a static-random-access memory, and processor 628. Processor executable instructions 610 for performing cryptographic operations 614 and obfuscation process 612 are stored at memory 608, as a non-limiting example, as microcode or another hardware-level instructions for implementing machine code instructions or internal state machine sequencing for performing some or a totality of the operations discussed herein for obfuscating a cryptographic parameter or for performing ECPM and ECCPM. Elliptical curve information 616 is also stored at memory 608, which includes information such as base point Q, coefficients, order n, modulus prime numbers for ECM, and standard name and type of ECCPM or ECCM, which are used for cryptographic processes such as ECDH and ECDSA, respectively.

Information that may change is stored at memory 618, such as precomputes 620, scalar 622 (i.e., scalar d), temporary variables 624 (e.g., the first obfuscated cryptographic parameter (i.e., new or randomized scalar k); the fully obfuscated cryptographic parameter (i.e., new formulation f) and the components thereof (i.e., variable e, non-zero constant w and random number z), and points on an elliptic curve P); and cryptographic information 626 (e.g., public private keys, shared secrets, session keys, without limitation).

Figure 7:
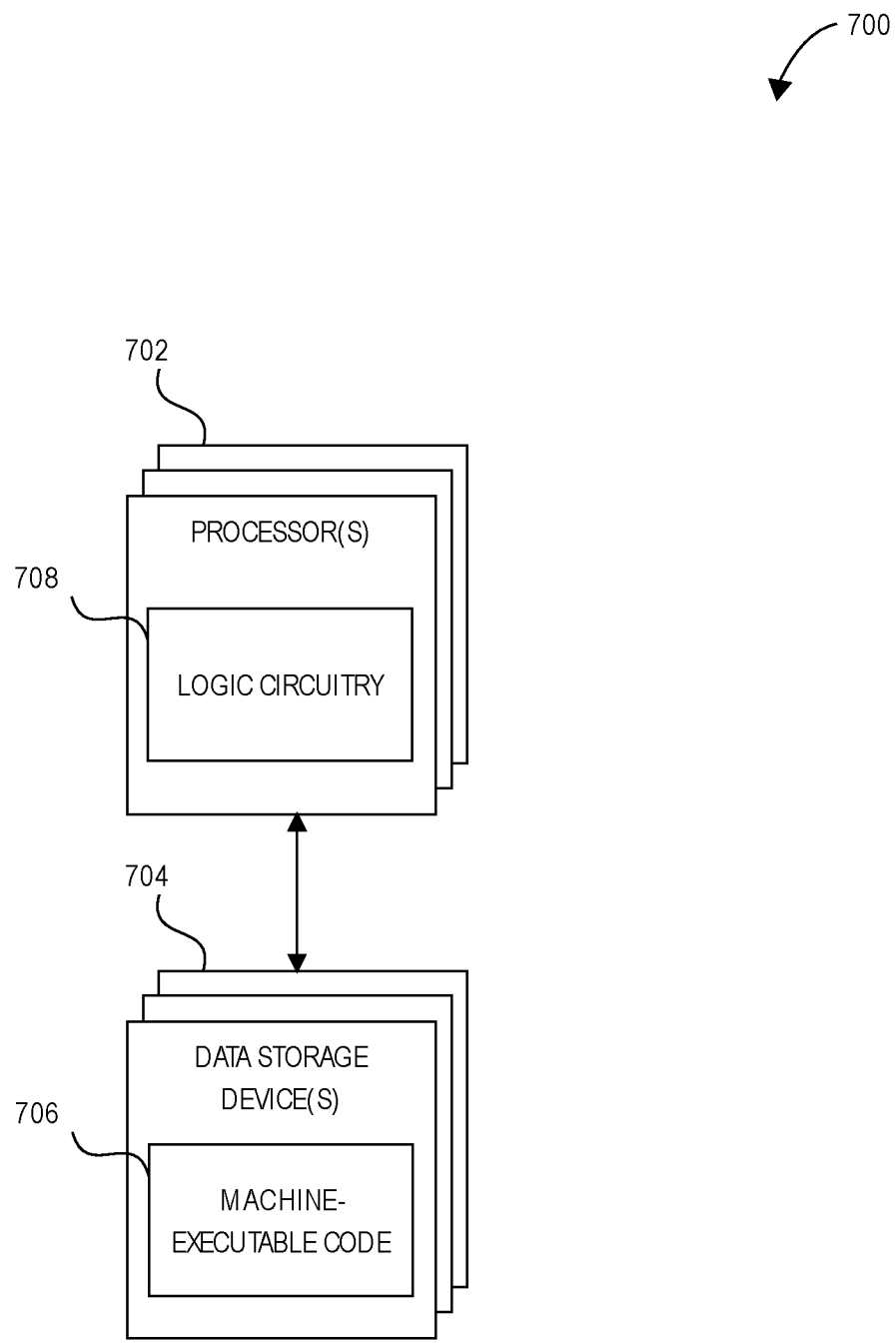
FIG. 7 is a bock diagram depicting a circuitry that, in some embodiments, may be used to implement various functions, operations, acts, processes, and/or methods disclosed herein, including on hardware circuitry.

FIG. 7 is a block diagram depicting a circuitry 700 that, in some embodiments, may be used to implement various functions, operations, acts, processes, and/or methods disclosed herein, including on hardware circuitry. The circuitry 700 includes one or more processors (sometimes referred to herein as "processors 702") operatively coupled to one or more apparatuses such as data storage devices (sometimes referred to herein as "storage 704"), without limitation. The storage 704 includes machine-executable code 706 stored thereon (e.g., stored on a computer-readable memory) and the processors 702 include logic circuitry 708. The machine-executable code 706 include information describing functional elements that may be implemented by (e.g., performed by) the logic circuitry 708. The logic circuitry 708 is adapted to implement (e.g., perform) the functional elements described by the machine-executable code 706. The circuitry 700, when executing the functional elements described by the machine-executable code 706, should be considered as special purpose hardware configured for carrying out functional elements disclosed herein such as operations of process 100, process 200*a*, process 200*b*, process 300, process 400*a*, and process 400*b*, and functional blocks of obfuscation process of circuit 500, and blocks of system 600. In some embodiments the processors 702 may be configured to perform the functional elements described by the machine-executable code 706 sequentially, concurrently (e.g., on one or more different hardware platforms), or in one or more parallel process streams.

When implemented by logic circuitry 708 of the processors 702, the machine-executable code 706 is configured to adapt the processors 702 to perform operations of embodiments disclosed herein. For example, the machine-executable code 706 may be configured to adapt the processors 702 to perform at least a portion or a totality of the operations discussed for process 300, process 400*a*, process 400*b*, and circuit 500.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some embodiments the storage 704 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 702 and the storage 704 may be implemented into a single device (e.g., a semiconductor device product, a system on chip (SOC), without limitation). In some embodiments the processors 702 and the storage 704 may be implemented into separate devices.

In some embodiments the machine-executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transmitted to a memory device (not shown) for execution, and executed by the processors 702 using at least the logic circuitry 708. Accordingly, in some embodiments the logic circuitry 708 includes electrically configurable logic circuitry 708.

In some embodiments the machine-executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDLTM) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 706 may include an HDL, an RTL, a GL description, a mask level description, other hardware description, or any combination thereof.

In embodiments where the machine-executable code 706 includes a hardware description (at any level of abstraction), a system (not shown, but including the storage 704) may be configured to implement the hardware description described by the machine-executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also by way of non-limiting example, the logic circuitry 708 may include hard-wired logic manufactured by a manufacturing system (not shown, but including the storage 704) according to the hardware description of the machine-executable code 706.

Regardless of whether the machine-executable code 706 includes computer-readable instructions or a hardware description, the logic circuitry 708 is adapted to perform the functional elements described by the machine-executable code 706 when implementing the functional elements of the machine-executable code 706. It is noted that although a hardware description may not directly describe functional elements, a hardware description indirectly describes functional elements that the hardware elements described by the hardware description are capable of performing.

As non-limiting examples, circuitry 700 may be implemented in secure cryptographic systems that utilize an ECC algorithm, which implements elliptic curve point multiplication, for example, a key fob token (such as RSA SecurID, as a non-limiting example), automated teller machines, financial transactions that include keys, a hardware lock, software licenses, and the like.

A person having ordinary skill in the art would appreciate numerous applications for embodiments discussed herein.

As a non-limiting example, cryptographic processes obfuscated in accordance with one or more embodiments may be used with key agreement protocols that involve elliptic curve point multiplication and modular exponentiation, such as include Elliptic Curve Diffie Hellman (ECDH), Elliptic Curve Digital Signature Algorithm (ECDSA), general Elliptic Curve Cryptography (ECC) algorithms, and Rivest-Shamir-Adleman (RSA), without limitation.

As a further non-limiting example, obfuscation processes discussed herein may be used to automatically instruct a processor to obfuscate parameters used in cryptographic processes in response to a query from a processor. For example, a disclosed obfuscation process may be automatically initiated in response to receipt of a cryptographic parameter at an aliased register that is memory mapped to logic circuitry for applying an obfuscation process on the cryptographic parameter to obtain an obfuscated cryptographic parameter. The aliased register may be associated with one or more cryptographic processes. The obfuscated cryptographic parameter may then be used as a parameter for cryptographic operations of a cryptographic process.

As a further non-limiting example, obfuscation processes and cryptographic processes using the same discussed herein may be used in public-key signature systems and signature verification, such as generating session keys.

As a further non-limiting example, techniques for obfuscating externally observable characteristics of a device including, without limitation, techniques that may be applied to any calculation that involves elliptic curve point multiplication (ECPM). Other similar environments do not exceed the scope of this disclosure. As a non-limiting example, the disclosed embodiments may apply to modular exponentiation used in Rivest-Shami-Adleman (RSA) modular exponentiation engines application chips. In such cases, the correlation from reading different precomputes is reduced and so it would be more difficult for an attacker to obtain a scalar by observing the power signature during reading (by the device) of obfuscated precomputes.

While bit-length of the obfuscated cryptographic parameter (e.g., the randomized expression or new formulation f, without limitation) is substantially the same bit-length as the bit-length of the cryptographic parameter, it should be appreciated that disclosed embodiments provide a person having ordinary skill in the art an option to control bit-length to the same bit length as the cryptographic parameter. As a non-limiting example, if desired, a person having ordinary skill in the art could modify disclosed embodiments to increase a range of random numbers available with corresponding increases in window size and bit length (relative to the bit length of the cryptographic parameter or first obfuscated cryptographic parameter).

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation,.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: a method of obfuscating at least a portion of a cryptographic process, the method comprising: obtaining an obfuscation parameter; applying an obfuscation process to an entire cryptographic parameter of a cryptographic process to obtain an obfuscated cryptographic parameter having substantially a same bit length as a bit length of the cryptographic parameter, wherein a parameter of the obfuscation process includes the obfuscation parameter; and performing cryptographic operations of a cryptographic process to obtain cryptographic information, wherein a parameter of the cryptographic operations includes the obfuscated cryptographic parameter.

Embodiment 2: the method according to Embodiment 1, wherein the applying the obfuscation process to the entire cryptographic parameter comprises applying an obfuscation operation to discrete window-sized portions of the cryptographic parameter.

Embodiment 3: the method according to any of Embodiments 1 and 2, wherein obtaining the obfuscation parameter comprises obtaining one or more of a cryptographic parameter length, a window size, and a degree of randomness.

Embodiment 4: the method according to any of Embodiments 1 through 3, wherein the applying the obfuscation process to the entire cryptographic parameter of the cryptographic process to obtain the obfuscated cryptographic parameter comprises: applying a first obfuscation process to the cryptographic parameter to obtain a first obfuscated cryptographic parameter; and reformatting the first obfuscated cryptographic parameter into a randomized expression corresponding to the first obfuscated cryptographic parameter.

Embodiment 5: the method according to any of Embodiments 1 through 4, wherein the reformatting the first obfuscated cryptographic parameter into the randomized expression corresponding to the first obfuscated cryptographic parameter, comprises: obtaining a first component of an expression corresponding to the first obfuscated cryptographic parameter, the first component having a non-zero value; obtaining a second component of the expression corresponding to the first obfuscated cryptographic parameter, the second component having a randomly generated value; and obtaining a third component of the expression corresponding to the first obfuscated cryptographic parameter, the third component having a value corresponding to a difference between values of the first obfuscated cryptographic parameter, the first component and the second component.

Embodiment 6: the method according to any of Embodiments 1 through 5, further comprising: ensuring a length of the obfuscated cryptographic parameter is the same as a length of the cryptographic parameter.

Embodiment 7: the method according to any of Embodiments 1 through 6, further comprising: obtaining a third component having a bit length that is the same as a bit length of the cryptographic parameter.

Embodiment 8: the method according to any of Embodiments 1 through 7, wherein the performing the cryptographic operations comprise performing one of: elliptic curve point multiplication operations or modular exponentiation operations.

Embodiment 9: the method according to any of Embodiments 1 through 8, further comprising: pre-computing results of performing at least some of the cryptographic operations responsive to the randomized expression.

Embodiment 10: the method according to any of Embodiments 1 through 9, further comprising: adjusting a degree of randomness associated with the obfuscation process by setting a most significant bit of a component of an expression corresponding to the obfuscated cryptographic parameter, the component having a randomly generated value.

Embodiment 11: the method according to any of Embodiments 1 through 10, further comprising: performing fixed-window based cryptographic operations responsive to a randomized expression that corresponds to the cryptographic parameter.

Embodiment 12: a crypto-engine of an electronic system, comprising: a processor; a first memory having processor-executable instructions stored thereon that, when executed by the processor, cause the processor to: apply an obfuscation process to an entire cryptographic parameter of a cryptographic process to obtain an obfuscated cryptographic parameter, wherein a bit length of the obfuscated cryptographic parameter is substantially the same as a bit length of the cryptographic parameter; and perform cryptographic operations of the cryptographic process to obtain cryptographic information, wherein a parameter of the cryptographic operations includes the obfuscated cryptographic parameter.

Embodiment 13: the crypto-engine according to Embodiment 12, wherein the cryptographic operations comprise operations for elliptic curve point multiplication operations or modular exponent operations.

Embodiment 14: the crypto-engine according to any of Embodiments 12 and 13, wherein the obfuscation process is configured to: apply a first obfuscation process to the cryptographic parameter to obtain a first obfuscated cryptographic parameter; and reformat the first obfuscated cryptographic parameter into a randomized expression corresponding to the first obfuscated cryptographic parameter.

Embodiment 15: the crypto-engine according to any of Embodiments 12 through 14, wherein the obfuscation process is configured to: obtain a first component of an expression that corresponds to the first obfuscated cryptographic parameter, wherein the first component has a non-zero value; obtain a second component of the expression that corresponds to the first obfuscated cryptographic parameter, wherein the second component has a randomly generated value; and obtain a third component of the expression that corresponds to the first obfuscated cryptographic parameter, wherein the third component has a value that corresponds to a difference between values of the first obfuscated cryptographic parameter, the first component and the second component.

Embodiment 16: the crypto-engine according to any of Embodiments 12 through 15, wherein the obfuscation process is configured to: pre-compute results of performing at least some of the cryptographic operations; and store the pre-computed results in a writable memory.

Embodiment 17: a computer-readable storage device having machine executable instructions that, when executed by a processor, are configured to enable the processor to perform operations comprising: obtaining an obfuscation parameter; applying an obfuscation process to an entire cryptographic parameter of a cryptographic process to obtain an obfuscated cryptographic parameter without increasing a bit length of the obfuscated cryptographic parameter relative to a bit length of the cryptographic parameter, wherein a parameter of the obfuscation process includes the obfuscation parameter; and performing cryptographic operations of a cryptographic process to obtain cryptographic information, wherein a parameter of the cryptographic operations includes the obfuscated cryptographic parameter.

Embodiment 18: the computer-readable storage device according to Embodiment 17, wherein the operations further comprise: applying a first obfuscation process to the cryptographic parameter to obtain a first obfuscated cryptographic parameter; and reformatting the first obfuscated cryptographic parameter into a randomized expression corresponding to the first obfuscated cryptographic parameter.

Embodiment 19: the computer-readable storage device according to any of Embodiments 17 and 18, wherein the operations further comprise: obtaining a first component of an expression that corresponds to the first obfuscated cryptographic parameter, wherein the first component has a non-zero value; obtaining a second component of the expression that corresponds to the first obfuscated cryptographic parameter, wherein the second component has a randomly generated value; and obtaining a third component of the expression that corresponds to the first obfuscated cryptographic parameter, wherein the third component has a value that corresponds to a difference between values of the first obfuscated cryptographic parameter, the first component and the second component.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of obfuscating at least a portion of a cryptographic process, the method comprising:
   obtaining an obfuscation parameter;
   applying an obfuscation process to an entire cryptographic parameter of a cryptographic process to obtain an obfuscated cryptographic parameter having substantially a same bit length as a bit length of the cryptographic parameter, wherein a parameter of the obfuscation process includes the obfuscation parameter;
   reformatting the obfuscated cryptographic parameter into an expression comprising a random number, a non-zero constant, and a variable component having a value based, at least in part, on the obfuscated cryptographic parameter, wherein a bit length of each of the random number, non-zero constant, and the variable component is selected based, at least in part, on the cryptographic parameter; and
   performing cryptographic operations of the cryptographic process to obtain cryptographic information, wherein a parameter of the cryptographic operations includes the obfuscated cryptographic parameter.

2. The method of claim 1, wherein the applying the obfuscation process to the entire cryptographic parameter comprises applying an obfuscation operation to discrete window-sized portions of the cryptographic parameter.

3. The method of claim 1, wherein obtaining the obfuscation parameter comprises obtaining one or more of a cryptographic parameter length, a window size, and a degree of randomness.

4. The method of claim 1, wherein
   the expression is a randomized expression corresponding to the obfuscated cryptographic parameter.

5. The method of claim 4, wherein the reformatting the obfuscated cryptographic parameter into the randomized expression corresponding to the obfuscated cryptographic parameter, comprises:
   obtaining a first component of an expression corresponding to the obfuscated cryptographic parameter, the first component having a non-zero value;
   obtaining a second component of the expression corresponding to the obfuscated cryptographic parameter, the second component having a randomly generated value; and
   obtaining a third component of the expression corresponding to the obfuscated cryptographic parameter, the third component having a value corresponding to a difference between values of the obfuscated cryptographic parameter, the first component and the second component.

6. The method of claim 4, further comprising:
   pre-computing results of performing at least some of the cryptographic operations responsive to the randomized expression.

7. The method of claim 1, further comprising:
   ensuring the bit length of the obfuscated cryptographic parameter is the same as the bit length of the cryptographic parameter.

8. The method of claim 1, further comprising:
   obtaining a component having a bit length that is the same as the bit length of the cryptographic parameter.

9. The method of claim 1 wherein the performing the cryptographic operations comprise performing one of: elliptic curve point multiplication operations or modular exponentiation operations.

10. The method of claim 1, further comprising:
    adjusting a degree of randomness associated with the obfuscation process by setting a most significant bit of a component of an expression corresponding to the obfuscated cryptographic parameter, the component having a randomly generated value.

11. The method of claim 1, further comprising:
    performing fixed-window based cryptographic operations responsive to a randomized expression that corresponds to the cryptographic parameter.

12. A crypto-engine of an electronic system, comprising:
    a processor;
    a first memory having processor-executable instructions stored thereon that, when executed by the processor, cause the processor to:
      apply an obfuscation process to an entire cryptographic parameter of a cryptographic process to obtain an obfuscated cryptographic parameter, wherein a bit length of the obfuscated cryptographic parameter is substantially the same as a bit length of the cryptographic parameter;
      reformat the obfuscated cryptographic parameter into an expression comprising a random number, a non-zero constant, and a variable component having a value based, at least in part, on the obfuscated cryptographic parameter, wherein a bit length of each of the random number, non-zero constant, and the variable component is selected based, at least in part, on the cryptographic parameter; and perform cryptographic operations of the cryptographic process to obtain cryptographic information, wherein a parameter of the cryptographic operations includes the obfuscated cryptographic parameter.

13. The crypto-engine of claim 12, wherein the cryptographic operations comprise operations for elliptic curve point multiplication operations or modular exponent operations.

14. The crypto-engine of claim 12, wherein
the expression is a randomized expression corresponding to the obfuscated cryptographic parameter.

15. The crypto-engine of claim 14, wherein the obfuscation process is configured to:
obtain a first component of an expression that corresponds to the obfuscated cryptographic parameter, wherein the first component has a non-zero value;
obtain a second component of the expression that corresponds to the obfuscated cryptographic parameter, wherein the second component has a randomly generated value; and
obtain a third component of the expression that corresponds to the obfuscated cryptographic parameter, wherein the third component has a value that corresponds to a difference between values of the obfuscated cryptographic parameter, the first component and the second component.

16. The crypto-engine of claim 12, wherein the obfuscation process is configured to:
pre-compute results of performing at least some of the cryptographic operations; and
store the pre-computed results in a writable memory.

17. A computer-readable storage device having machine executable instructions that, when executed by a processor, are configured to enable the processor to perform operations comprising:
obtaining an obfuscation parameter;
applying an obfuscation process to an entire cryptographic parameter of a cryptographic process to obtain an obfuscated cryptographic parameter without increasing a bit length of the obfuscated cryptographic parameter relative to a bit length of the cryptographic parameter, wherein a parameter of the obfuscation process includes the obfuscation parameter;
reformatting the obfuscated cryptographic parameter into an expression comprising a random number, a non-zero constant, and a variable component having a value based, at least in part, on the obfuscated cryptographic parameter, wherein a bit length of each of the random number, non-zero constant, and the variable component is selected based, at least in part, on the cryptographic parameter; and
performing cryptographic operations of the cryptographic process to obtain cryptographic information, wherein a parameter of the cryptographic operations includes the obfuscated cryptographic parameter.

18. The computer-readable storage device of claim 17, wherein
the expression is a randomized expression corresponding to the obfuscated cryptographic parameter.

19. The computer-readable storage device of claim 18, wherein the operations further comprise:
obtaining a first component of an expression that corresponds to the obfuscated cryptographic parameter, wherein the first component has a non-zero value;
obtaining a second component of the expression that corresponds to the obfuscated cryptographic parameter, wherein the second component has a randomly generated value; and
obtaining a third component of the expression that corresponds to the obfuscated cryptographic parameter, wherein the third component has a value that corresponds to a difference between values of the obfuscated cryptographic parameter, the first component and the second component.

20. The computer-readable storage device of claim 18, wherein the operations further comprise:
pre-computing results of performing at least some of the cryptographic operations; and
storing the pre-computed results in a writable memory.

* * * * *

UNITED STATES PATENT AND TRADEMARK OFFICE
CERTIFICATE OF CORRECTION

PATENT NO. : 11,936,768 B2
APPLICATION NO. : 17/086007
DATED : March 19, 2024
INVENTOR(S) : Huiming Chen It is certified that error appears in the above-identified patent and that said Letters Patent is hereby corrected as shown below:

In the Specification

| | | |
|---|---|---|
| Column 9, | Line 58, | change "parameter, i.e. without" to --parameter, i.e., without-- |
| Column 15, | Line 11, | change "ECCPM or ECCM, which" to --ECCPM or ECPM, which-- |
| Column 16, | Line 50, | change "language (VHDLTM) may" to --language (VHDL™) may-- |

In the Claims

| | | | |
|---|---|---|---|
| Claim 4, | Column 22, | Lines 5-6, | change "wherein the expression" to --wherein the expression-- |
| Claim 14, | Column 23, | Lines 11-12, | change "wherein the expression" to --wherein the expression-- |
| Claim 18, | Column 24, | Lines 18-19, | change "wherein the expression" to --wherein the expression-- |

Signed and Sealed this
Twenty-first Day of May, 2024

*Katherine Kelly Vidal*

Katherine Kelly Vidal
*Director of the United States Patent and Trademark Office*